(12) United States Patent
Weber et al.

(10) Patent No.: US 7,098,266 B2
(45) Date of Patent: Aug. 29, 2006

(54) POLYARYLETHERSULPHONE AND POLYAMIDE-BASED THERMOPLASTIC MOULDABLE MASSES WITH IMPROVED PROCESSING CHARACTERISTICS

(75) Inventors: Martin Weber, Maikammer (DE); Joachim Queisser, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 679 days.

(21) Appl. No.: 10/148,728

(22) PCT Filed: Dec. 6, 2000

(86) PCT No.: PCT/EP00/12278

§ 371 (c)(1),
(2), (4) Date: Jun. 5, 2002

(87) PCT Pub. No.: WO01/44370

PCT Pub. Date: Jun. 21, 2001

(65) Prior Publication Data

US 2003/0069371 A1 Apr. 10, 2003

(30) Foreign Application Priority Data

Dec. 16, 1999 (DE) .......................... 199 61 040

(51) Int. Cl.
*C08J 3/20* (2006.01)

(52) U.S. Cl. .................. 524/538; 525/535; 525/536
(58) Field of Classification Search ................ 524/538; 525/535, 536
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Handford | |
| 2,312,966 A | 3/1943 | Hanford | |
| 2,512,606 A | 6/1950 | Bolton | |
| 3,393,210 A | 7/1968 | Speck | |
| 3,651,014 A | 3/1972 | Witsiepe | |
| 4,161,470 A | 7/1979 | Calundann | |
| 4,731,432 A | 3/1988 | Portugall | |
| 4,751,128 A | 6/1988 | Portugall | |
| 4,857,625 A | 8/1989 | Clendinning | |
| 4,870,153 A | 9/1989 | Matzner | |
| 4,873,289 A | 10/1989 | Lindner | |
| 5,612,425 A | 3/1997 | Weber | |
| 5,639,833 A | 6/1997 | Weber | |

FOREIGN PATENT DOCUMENTS

| | | |
|---|---|---|
| EP | 038 094 | 10/1981 |
| EP | 038 582 | 10/1981 |
| EP | 039 524 | 11/1981 |
| EP | 185 237 | 6/1986 |
| EP | 266 839 | 5/1988 |
| EP | 477 757 | 4/1992 |
| GB | 1152035 | 5/1969 |

OTHER PUBLICATIONS

BASF OZ 0050/36693–Preparation of Polyethers.
Polymer 1993, vol. 34, No. 13, Esse et al., 2836–2844.
Macromol.Chem.Phys,95,1709–117(1994) Koch et al.1709–17.
Poly.Eng.&Sci,Aug. 1977,vol.17,No.8,McGrath et al,647651.
Makromolekuele,490–491.
Polymer,1987,vol.30,Jurek et al., 1552–1557.
Trans.of the ASAE, Schiebe et al., 491–496.
Gaechter et al., Taschenbuch der Kunststoffadditive Carl–Hanser–Verlag (1983).
G.Benzing,Pigmente fur Anstrichmitten, Expert–Verlag (1983).
Patent Abst. of Japan 61179816.

*Primary Examiner*—Randy Golakowski
*Assistant Examiner*—Christopher Keehan
(74) *Attorney, Agent, or Firm*—Novak Druce & Quigg

(57) ABSTRACT

Molding compositions comprise
  A) from 1 to 98.8% by weight of at least one polyarylene ether sulfone,
  B) from 1 to 98.8% by weight of at least one thermoplastic polyamide,
  C) from 0.1 to 60% by weight of at least one filler,
  D) from 0 to 40% by weight of at least one impact-modifying rubber,
  E) from 0 to 40% by weight of one or more different additives, and
  F) from 0.1 to 30% by weight of at least one thermotropic polymer,
where the total of the percentages by weight of components A to F is 100%, wherein component B has a viscosity number of from 180 to 350 ml/g (measured in a 0.5% strength by weight solution in 96% strength by weight sulfuric acid to DIN 53 727).

10 Claims, No Drawings

POLYARYLETHERSULPHONE AND POLYAMIDE-BASED THERMOPLASTIC MOULDABLE MASSES WITH IMPROVED PROCESSING CHARACTERISTICS

The present invention relates to molding compositions which comprise
- A) from 1 to 98.8% by weight of at least one polyarylene ether sulfone,
- B) from 1 to 98.8% by weight of at least one thermoplastic polyamide,
- C) from 0.1 to 60% by weight of at least one filler,
- D) from 0 to 40% by weight of at least one impact-modifying rubber,
- E) from 0 to 40% by weight of one or more different additives, and
- F) from 0.1 to 30% by weight of at least one thermotropic polymer, where the total of the percentages by weight of components A to F is 100%, wherein component B has a viscosity number of from 180 to 350 ml/g (measured in a 0.5% strength by weight solution in 96% strength by weight sulfuric acid to DIN 53 727).

The present invention further relates to the use of these molding compositions for producing moldings, films or fibers, and also to the resultant moldings, films or fibers.

Molding compositions based on polyarylene ether sulfones and on polyamides are well known. Molding compositions of this type usually have better flow properties than pure polyarylene ether sulfones.

Blends made from polyarylene ether sulfones with polyamides having at least 50% by weight of hexamethylene terephthalamide units were disclosed in EP-A 477 757. Other components mentioned in these blends include entirely aromatic, thermoplastic, liquid-crystalline polyesters. In the blends mentioned preference is given to polyamides with viscosity numbers of up to 140 ml/g (corresponding to $\eta_{red}$ of 1.4 dl/g), since polyamides with higher viscosity numbers also have high melt viscosities and the blends prepared from these are difficult to process.

The German Patent Application with file reference number 19839331.8 describes blends made from polyarylene ether sulfones with polyamides having viscosity numbers of at least 180 ml/g, which in addition comprise stabilizers based on copper bromide or copper iodide. When these blends are exposed to high temperatures for long periods their mechanical properties are only slightly impaired.

It is an object of the present invention to provide thermoplastic molding compositions which are based on polyarylene ether sulfones and on polyamides and which have good mechanical properties together with improved flowability and stability during processing, in particular melt stability.

We have found that this object is achieved by the molding compositions defined at the outset and described in more detail below.

Component A

The novel molding compositions comprise, based on the total weight of A to F, from 1 to 98.8% by weight, in particular from 7.5 to 92.19% by weight and particularly preferably from 10 to 88.49% by weight, of component A.

According to the invention a polyarylene ether sulfone is used as component A. The component A used may also be a mixture made from two or more different polyarylene ether sulfones.

The arylene groups of the polyarylene ether sulfones A may be identical or different and, independently of one another, are an aromatic radical having from 6 to 18 carbon atoms. Examples of suitable arylene radicals are phenylene, biphenylene, terphenylene, 1,5-naphthylene, 1,6-naphthylene, 1,5-anthrylene, 9,10-anthrylene and 2,6-anthrylene. Among these, preference is given to 1,4-phenylene and 4,4'-biphenylene. These aromatic radicals are preferably unsubstituted. However, they may have one or more substituents. Examples of suitable substituents are alkyl, arylalkyl, aryl, nitro, cyano and alkoxy groups, and also heteroaromatics, such as pyridine, and halogen. Preferred substituents include alkyl having up to 10 carbon atoms, such as methyl, ethyl, isopropyl, n-hexyl and isohexyl, $C_1$–$C_{10}$-alkoxy, such as methoxy, ethoxy, n-propoxy and n-butoxy, aryl having up to 20 carbon atoms, such as phenyl or naphthyl, and also fluorine and chlorine.

Other preferred substituents are those obtainable by reacting the polyarylene ether sulfones with a reactive compound which has, besides a carbon-carbon double or triple bond, one or more carbonyl, carboxylic acid, carboxylate, anhydride, amide, imide, carboxylic ester, amino, hydroxyl, epoxy, oxazoline, urethane, urea, lactam or halobenzyl groups. The bonding of the arylene groups to one another in the polyarylene ether sulfones may be via —SO$_2$—, or, for example, via —O—, —S—, —SO—, —CO—, —N=N—, —COO—, or via an unsubstituted or substituted alkylene radical, or via a chemical bond.

Preferred polyarylene ether sulfones which can be used according to the invention (component A) have a structure made from repeat units of the formula I

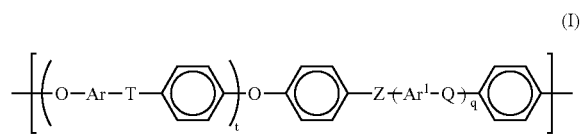

(I)

where
- t and q, independently of one another, are 0, 1, 2 or 3,
- each of Q, T and Z, independently of one another, is a chemical bond or a group selected from the class consisting of —O—, —S—, —SO$_2$—, S=O, C=O, —N=N—, —R$^a$C=CR$^b$— and —CR$^c$R$^d$—,
- each of R$^a$ and R$^b$, independently of one another, is hydrogen or $C_1$–$C_{12}$-alkyl and
- each of R$^c$ and R$^d$, independently of one another, is hydrogen or $C_1$–$C_{12}$-alkyl, $C_1$–$C_{12}$-alkoxy or $C_6$–$C_{18}$-aryl, where, if desired, R$^c$ and R$^d$, if they are alkyl, alkoxy or aryl, may independently of one another have fluorine and/or chlorine substituents or, together with the carbon atom to which they are bonded, may form a $C_3$–$C_{12}$-cycloalkyl group, which may be unsubstituted or substituted by one or more $C_1$–$C_6$-alkyl groups, with the proviso that at least one of the groups T, Q and Z is —SO$_2$— and, if t and q are O, Z is —SO$_2$—, and
- Each of Ar and Ar$^1$, independently of one another, is $C_6$–$C_{18}$-arylene, unsubstituted or substituted by $C_1$–$C_{12}$-alkyl, $C_6$–$C_{18}$-aryl, $C_1$–$C_{12}$-alkoxy or halogen.

It is also possible for different units of the formula I to be present in the polyarylene ether sulfone, distributed randomly or in blocks.

Polyarylene ethers A which can be used according to the invention may be prepared, for example, in a manner similar to that of GB 1 152 035 and U.S. Pat. No. 4,870,153, which are expressly incorporated herein by way of reference. Examples of suitable process conditions for the synthesis of polyarylene ether sulfones are described in EP-A-0 113 112 and EP-A-0 135 130. The reaction of the monomers in aprotic polar solvents in the presence of anhydrous alkali metal carbonate is particularly suitable. A particularly preferred combination is N-methylpyrrolidone as solvent and potassium carbonate as catalyst. The reaction in the melt is similarly preferred. Examples of suitable polyarylene ether sulfones A are those having at least one of the following repeat structural units $I_1$ to $I_{15}$:

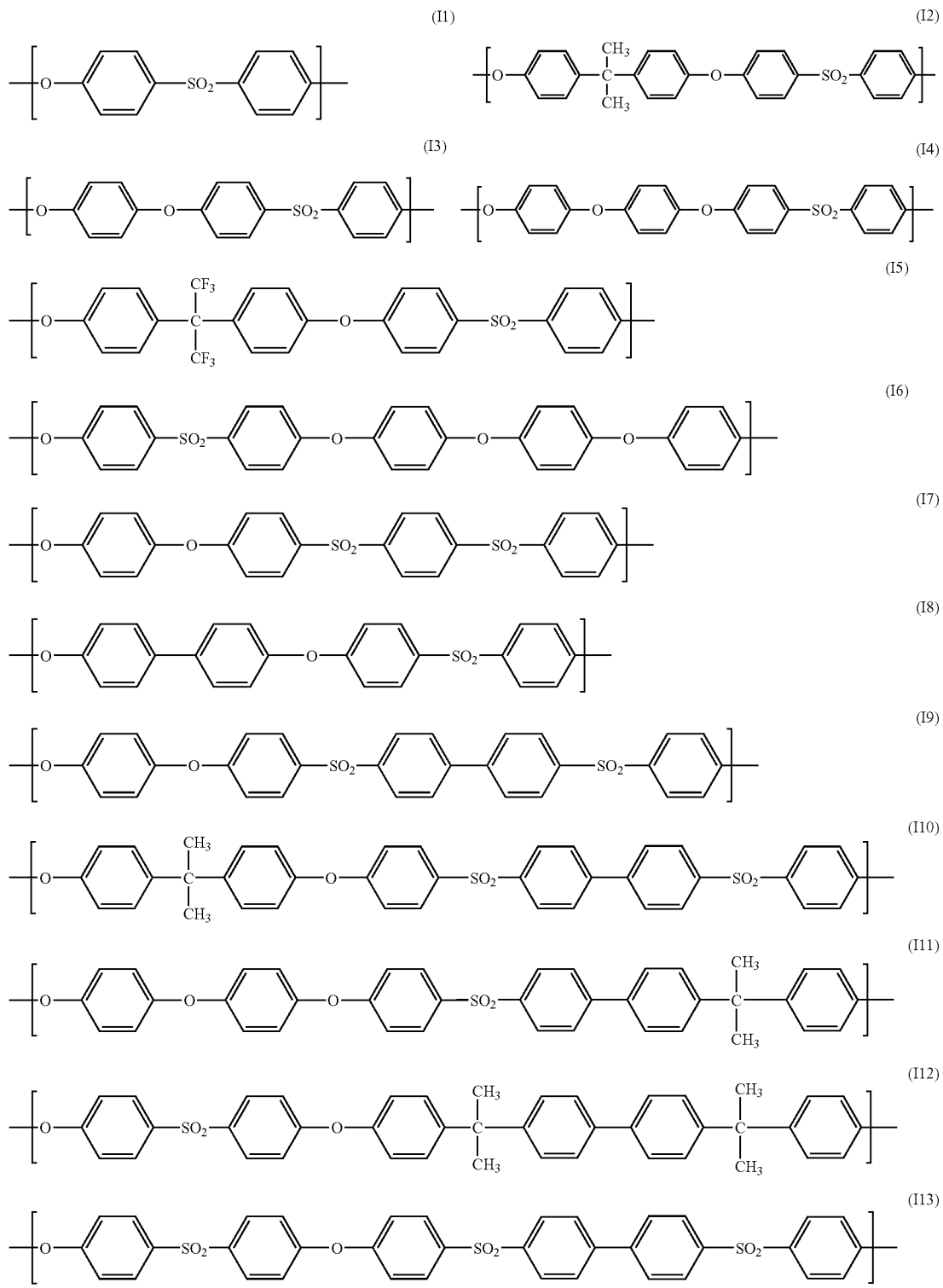

-continued

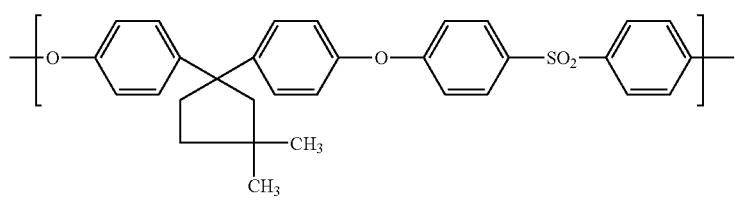

(I14)

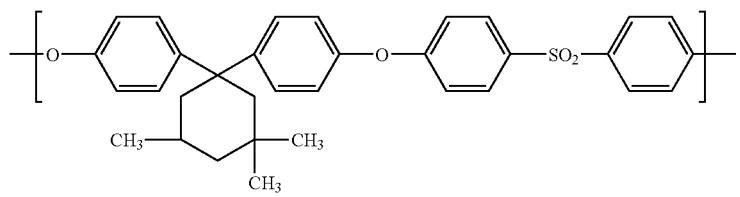

(I15)

Particularly preferred units of the formula I are those of the formulae I₁, and I₂, individually or mixed.

Depending on the conditions for the synthesis, the polyarylene ether sulfones may have various groups. These groups may have bonding to atoms of the polymer chain or be end groups of the polymer chain. These groups include those which are inert to component B and those which can react with polyamides B, in particular with the amino and carboxyl groups.

Inert groups include halo, in particular chloro, alkoxy, particularly methoxy or ethoxy, aryloxy, preferably phenoxy, and benzyloxy groups. Examples of reactive groups are hydroxyl, amino, anhydride, epoxy and carboxyl. Particular preference is given to polyarylene ether sulfones having amino, anhydride or epoxy end groups or a mixture of these.

In one embodiment, the novel molding compositions comprise polyarylene ether sulfones A which are essentially free from reactive groups. However, in a preferred embodiment, a mixture of different polyarylene ether sulfones having inert and reactive groups may be used. The proportion of polyarylene ether sulfones having reactive groups may be from 2 to 98% by weight, preferably from 5 to 50% by weight, based on component A.

A particularly suitable component A is a mixture made from at least one polyarylene ether sulfone a1 having groups which are inert to the polyamides B and from at least one polyarylene ether sulfone a2 which contains groups which can react with the polyamides B.

Particularly suitable groups which may be mentioned in the polyarylene ether sulfones a2 are anhydride, carboxyl, epoxy or amino groups or a mixture of these.

In one embodiment, the preferred polyarylene ether sulfones include, in particular in a mixture with polyarylene ether sulfones which contain inert groups, carboxyl-containing polyarylene ether sulfones having repeat structural units of formulae I and II

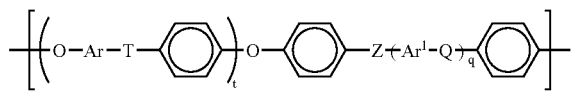

(I)

-continued (II)

$$\left[ O - \bigcirc - \underset{(CH_2)_n}{\overset{R^1}{C}} - \bigcirc - O - Ar^2 - Y - Ar^3 \right]$$

COOH where the variables and radicals are as defined above and
R¹ is H, $C_1$–$C_6$-alkyl or —$(CH_2)_n$—COOH,
n is an integer from 0 to 6,
each of $Ar^2$ and $Ar^{3,}$ independently of one another, is $C_6$–$C_{18}$-arylene, and these may have substitution by one or more $C_1$–$C_{12}$-alkyl, $C_6$–$C_{18}$-aryl or $C_1$–$C_{12}$-alkoxy groups, or by halogen, and
Y is a chemical bond or a group selected from the class consisting of —O—, —S—, —SO₂—, S=O, C=O, —N=N—, —R$^a$C=CR$^b$— and —CR$^c$R$^d$—.

These carboxyl-containing polyarylene ethers are obtainable, for example, by methods similar to the processes described in EP-A-0 185 237, or else those described by I. W. Parsons et al., in Polymer, 34, 2836 (1993) and T. Koch, H. Ritter, in Macromol. Phys. 195, 1709 (1994).

Examples of suitable structural elements II are:

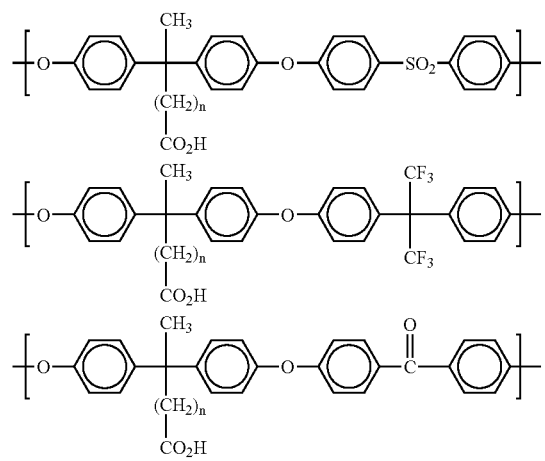

where each n is 0, 1, 2, 3, 4, 5 or 6.

The polyarylene ether sulfones containing acid groups have viscosity numbers of from about 15 to 80 ml/g (determined in 1% strength NMP solution at 25° C.). If these polyarylene ether sulfones containing acid groups are used, the proportion of free acid groups in component A is preferably from 0.05 to 25 mol %, preferably from 0.1 to 20 mol % and in particular from 0.1 to 15 mol %. The proportion of acid groups is determined by $^1$H-NMR, as described by I. W. Parsons et al., Polymer, 34, 2836 (1993).

Polyarylene ether sulfones A having hydroxyl end groups may be prepared, for example, by suitably selecting the molar ratio between dihydroxy monomers and dichloro monomers (see, for example, McGrath et al Polym. Eng. Sci. 17, 647 (1977); Elias "Makromoleküle" 4th Edn. (1981) pp. 490–493, Hüitig & Wepf. Verlag, Basle).

Polyarylene ether sulfones A which have amino end groups may, for example, be obtained via the presence of p-aminophenol during the polymerization (J. E. Mc. Grath, Polymer 30, 1552 (1989)).

The preparation of polyarylene ether sulfones containing anhydride end groups is described, for example, in DE-A 44 29 107. Other suitable polyarylene ether sulfones, grafted with anhydrides, may be prepared as described in EP-A 513 488.

Polyarylene ether sulfones having epoxy end groups can be prepared from polyarylene ether sulfones having OH end groups by, for example, reacting the latter with suitable compounds which have propylene oxide groups or from which propylene oxide groups are obtainable, preferably epichlorohydrin.

The reaction of the hydroxyl-terminated polyarylene ether sulfones with epichlorohydrin preferably takes place at from 30 to 200° C. in a solvent. Examples of suitable solvents for this are aliphatic or aromatic sulfoxides or sulfones, or else N-methylpyrrolidone. The reaction is generally carried out in a weakly basic medium to avoid, as far as possible, ring-opening of the epoxy groups.

The polyarylene ether sulfones A may also be (block) copolymers which contain polyarylene ether sulfone segments and segments of other thermoplastic polymers, such as polyesters, aromatic polycarbonates, polyester carbonates, polysiloxanes, polyimides or polyetherimides. The molar masses (number-average) of the blocks or of the graft branches in the copolymers are generally from 1000 to 30,000 g/mol. The blocks of different structure may have an alternating or random arrangement. The proportion by weight of the polyarylene ether sulfones in the (block) copolymers is generally at least 10% by weight. The proportion by weight of the polyarylene ether sulfones may be up to 97% by weight. Preference is given to (block) copolymers with a proportion by weight of up to 90% by weight of polyarylene ether sulfones. Particularly preferred (block) copolymers have from 20 to 80% by weight of polyarylene ether sulfones.

The average molar masses Mn (number-average) of the polyarylene ether sulfones are generally from 5000 to 60,000 g/mol, and their relative viscosities are generally from 0.20 to 0.95 dl/g. Depending on the solubility of the polyarylene ether sulfones, the relative viscosities are determined either in 1% strength by weight N-methylpyrrolidone solution, in mixtures made from phenol and dichlorobenzene, or in 96% strength sulfuric acid, in each case at 20 or 25° C.

Component B

Based on the total weight of A to F, from 1 to 98.8% by weight, in particular from 7.5 to 92.19% by weight, particularly preferably from 10 to 88.49% by weight of component B is present in the novel molding compositions.

The component B used according to the invention is one or more thermoplastic polyamides which have a viscosity number of from 180 to 350 ml/g, particularly preferably from 190 to 350 ml/g, in particular from 190 to 240 ml/g (measured in 0.5% strength by weight solution in 96% strength by weight sulfuric acid to DIN 53 727).

Suitable polyamides may be semicrystalline or amorphous resins with a molecular weight $M_w$ (weight-average) of at least 5000, for example as described in the U.S. Pat. Nos. 2,071,250, 2,071,251, 2,130,523, 2,130,948, 2,241, 322, 2,312,966, 2,512,606 and 3,393,210.

Examples of these are polyamides which derive from lactams having from 7 to 13 ring members, such as polycaprolactam, polycaprylolactam or polylaurolactam, and also polyamides which are obtained by reacting dicarboxylic acids with diamines.

Polyamides B may, for example, be prepared by condensing equimolar amounts of a saturated or aromatic dicarboxylic acid having from 4 to 16 carbon atoms with a saturated or aromatic diamine which has up to 16 carbon atoms, or by condensing ω-aminocarboxylic acids or, respectively, polyaddition of corresponding lactams.

Other polyamides suitable according to the invention are aliphatic (co)polyamides.

Particular examples of dicarboxylic acids in aliphatic polyamides are alkanedicarboxylic acids having from 6 to 12 carbon atoms, in particular from 6 to 10 carbon atoms. Merely by way of example, mention may be made here of adipic acid, suberic acid, azelaic acid, sebacic acid and dodecanedioic acid.

Preferred suitable diamines in aliphatic polyamides are alkanediamines having from 4 to 12 carbon atoms, in particular from 4 to 8 carbon atoms, for example 1,4-butanediamine, 1,5-pentanediamine and piperazine and the cyclic diamines
di(4-aminocyclohexyl)methane and
2,2-di(4-aminocyclohexyl)propane.

It is, of course, also possible to use aminocarboxylic acids or, respectively, the corresponding lactams having, for example, from 6 to 13 carbon atoms as polyamide-forming monomers for aliphatic polyamides. Examples of suitable monomers of this type are caprolactam, caprylolactam, enantholactam, ω-aminoundecanoic acid and laurolactam.

Examples of preferred aliphatic polyamides are
polyhexamethyleneadipamide (nylon-6,6),
polyhexamethyleneazelamide (nylon-6,9),
polyhexamethylenesebacamide (nylon-6,10), and
polyhexamethylenedodecandiamide (nylon-6,12), the polyamides obtained via ring-opening of lactams, such as polycaprolactam and polylaurolactam, and also poly-11-aminoundecanoic acid and a polyamide made from di(p-aminocyclohexyl)methane and
dodecanedioic acid, and also the copolyamides nylon-6/6-6, in particular with a proportion of from 5 to 95% by weight of caprolactam units.

Other polyamides which should be mentioned are those obtainable, for example, by condensing 1,4-diaminobutane with adipic acid at an elevated temperature (nylon-4,6). Preparation processes for polyamides of this structure are described, for example, in EP-A 38 094, EP-A 38 582 and EP-A 39 524.

Other suitable polyamides are those obtainable by copolymerizing two or more of the abovementioned monomers, and mixtures of two or more polyamides, in any desired mixing ratio.

A preferred embodiment of the invention uses partly aromatic polyamides. These may be prepared by copolycondensing, for example, adipic acid, isophthalic acid and/or terephthalic acid with hexamethylenediamine or copolycondensing caprolactam and terephthalic acid with hexamethylenediamine. Partly aromatic copolyamides of this type preferably contain, as component $b_1$, from 20 to 90% by weight of units which derive from terephthalic acid and from hexamethylenediamine. A small proportion of the terephthalic acid, preferably not more than 10% by weight of all of the aromatic dicarboxylic acids used, may be replaced by isophthalic acid or by other aromatic dicarboxylic acids, preferably those where the carboxyl groups are in para position.

Besides the units which derive from terephthalic acid and from hexamethylenediamine, the partly aromatic copolyamides may contain units ($b_2$) which derive from ε-caprolactam and/or units ($b_3$) which derive from adipic acid and from hexamethylenediamine.

The proportion of units $b_2$ which derive from ε-caprolactam is usually from 10 to 80% by weight, preferably from 20 to 50% by weight, in particular from 25 to 40% by weight, while the proportion of units $b_3$ which derive from adipic acid and from hexamethylenediamine is up to 70% by weight, preferably from 30 to 60% by weight and in particular from 35 to 55% by weight. The total of the percentages by weight of components $b_1$ to $b_3$ is always 100.

In the case of copolyamides which contain units of ε-caprolactam and also units of adipic acid and hexamethylenediamine, care should be taken that the proportion of units which are free from aromatic groups is at least 10% by weight, preferably at least 20% by weight. The ratio of units which derive from ε-caprolactam and from adipic acid and from hexamethylenediamine is not subject here to any particular limitation.

In another embodiment, component B is composed of, based on the total weight of component B, from 40 to 100% by weight, preferably from 50 to 100% by weight and in particular from 70 to 100% by weight, of a partly aromatic, semicrystalline, thermoplastic polyamide which has been built up from $b'_1$) from 30 to 44 mol %, preferably from 32 to 40 mol % and in particular from 32 to 38 mol %, of units which derive from terephthalic acid, $b'_2$) from 6 to 20 mol %, preferably from 10 to 18 mol % and in particular from 12 to 18 mol %, of units which derive from isophthalic acid, $b'_3$) from 43 to 49.5 mol %, preferably from 46 to 48.5 mol % and in particular from 46.3 to 48.2 mol %, of units which derive from hexamethylenediamine, and $b'_4$) from 0.5 to 7 mol %, preferably from 1.5 to 4 mol % and in particular from 1.8 to 3.7 mol %, of units which derive from cyclic aliphatic diamines having from 6 to 30 carbon atoms, preferably from 13 to 29 carbon atoms and in particular from to 17 carbon atoms, where the total of the molar percentages of components $b'_1$ to $b'_4$ is 100%.

The diamine units $b'_3$ and $b'_4$ are preferably reacted in equimolar quantities with the dicarboxylic acid units $b'_1$ and $b'_2$.

Preferred suitable monomers $b'_4$ are cyclic diamines of the formula (III)

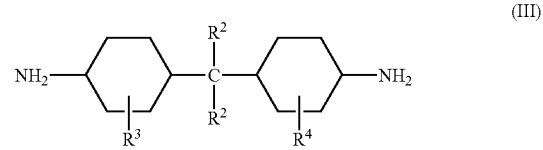

where
$R^2$ is hydrogen or $C_1$–$C_4$-alkyl,
$R^3$ is $C_1$–$C_4$-alkyl or hydrogen, and
$R^4$ is $C_1$–$C_4$-alkyl or hydrogen.

Preferred diamines $b'_4$ are bis(4-aminocyclohexyl)methane, bis(4-amino-3-methylcyclohexyl)methane, bis(4-aminocyclohexyl)-2,2'-propane and bis(4-amino-3-methylcyclohexyl)-2,2'-propane.

Other monomers $b'_4$ which may be mentioned are 1,3- and 1,4-cyclohexanediamine and isophoronediamine.

Besides the units $b'_1$ to $b'_4$ described above, the partly aromatic copolyamides B may contain, based on B, up to 4% by weight, preferably up to 3.5% by weight, of other polyamide-forming monomers $b'_5$, as known from other polyamides.

Possible other polyamide-forming monomers $b'_5$ are aromatic dicarboxylic acids which have from 8 to 16 carbon atoms. Examples of suitable aromatic dicarboxylic acids are substituted terephthalic and isophthalic acids, such as 3-tert-butylisophthalic acid, polycyclic dicarboxylic acids, e.g. 4,4'- and 3,3'-diphenyldicarboxylic acid, 4,4'- and 3,3'-diphenylmethanedicarboxylic acid, 4,4'- and 3,3'-diphenyl sulfone dicarboxylic acid, 1,4- and 2,6-naphthalenedicarboxylic acid and phenoxyterephthalic acid.

Other polyamide-forming monomers $b'_5$ may derive from dicarboxylic acids having from 4 to 16 carbon atoms and from aliphatic diamines having from 4 to 16 carbon atoms, or else from aminocarboxylic acids or, respectively, from corresponding lactams having from 7 to 12 carbon atoms. Suitable monomers of these types which may be mentioned here merely as examples are suberic acid, azelaic acid and sebacic acid as representatives of the aliphatic dicarboxylic acids, and 1,4-butanediamine, 1,5-pentanediamine and piperazine as representatives of the diamines, and caprolactam, caprylolactam, enantholactam, ω-aminoundecanoic acid and laurolactam as representatives of lactams or, respectively, aminocarboxylic acids.

Preferred partly aromatic copolyamides B have triamine contents below 0.5% by weight, preferably below 0.3% by weight.

Compared with products of the same composition but higher triamine content, copolyamides with a low triamine content have lower melt viscosities at the same solution viscosity. This considerably improves both processability and product properties.

The melting points of the partly aromatic copolyamides are from 270 to 340° C., preferably from 280 to 330° C., and this melting point is associated with a high glass transition temperature, generally 110° C. or above, in particular above 130° C. (in the dry state).

Partly aromatic copolyamides B generally feature degrees of crystallinity of >30%, preferably >35%, and in particular >40%.

The degree of crystallinity is a measure of the proportion of crystalline fragments in the copolyamide and is determined by X-ray scattering or indirectly by measuring $\Delta H_{crist.}$.

It is, of course, also possible to use mixtures of different partly aromatic copolyamides, or else mixtures made from aliphatic and from partly aromatic (co)polyamides, and in each case the mixing ratio may be as desired.

Suitable processes for preparing the polyamides B are known to the skilled worker.

A preferred method of preparation is the batch process. For this, the aqueous monomer solution is heated in an autoclave within a period of from 0.5 to 3 h to 280–340° C., achieving a pressure of from 10 to 50 bar, in particular from 15 to 40 bar, and this pressure is held as steady as possible for up to 2 h by releasing excess water vapor. The pressure in the autoclave is then reduced at constant temperature within a period of from 0.5 to 2 h to give a final pressure of from 1 to 5 bar. The polymer melt is then discharged, cooled and pelletized.

Another process is based on those described in EP-A 129195 and 129 196. To prepare partly aromatic copolyamides, for example, by this method an aqueous solution of the monomers $b'_1$) to $b'_4$), and also, if desired, $b'_5$), with a monomer content of from 30 to 70% by weight, preferably from 40 to 65% by weight, is heated to 280–330° C. at elevated pressure (from 1 to 10 bar) for a period of less than 60 s with simultaneous evaporation of water and formation of a prepolymer. The prepolymer and vapor are then continuously separated and the vapor rectified, and the entrained diamines passed back to the mixture. Finally, the prepolymer is passed to a polycondensation zone and polycondensed at a gauge pressure of from 1 to 10 bar at from 280 to 330° C. for a residence time of from 5 to 30 min. The temperature in the reactor is, of course, above that required at the respective water-vapor pressure to melt the prepolymer being produced.

These short residence times substantially prevent the formation of triamines.

The polyamide prepolymer obtained in the manner described and generally having a viscosity number of from 40 to 70 ml/g, preferably from 40 to 60 ml/g, measured on a 0.5% strength by weight solution in 96% strength sulfuric acid at 25° C., is continuously removed from the condensation zone.

It is advantageous to pass the molten polyamide prepolymer through a discharge zone, at the same time removing the residual water present in the melt. An example of a suitable discharge zone is a vented extruder. The melt freed from water may then be cast into extrudates and pelletized.

These pellets are condensed to the required viscosity in the solid phase under an inert gas, continuously or batchwise, at below the melting point, e.g. from 170 to 240° C. For the batchwise solid-phase condensation use may be made of tumbling dryers, for example, and for the continuous solid-phase condensation use may be made of annealing tubes through which hot inert gas passes. Preference is given to the continuous solid-phase condensation, and the inert gas used is nitrogen or in particular superheated steam, advantageously the steam available at the top of the column.

In another embodiment it is also possible for components A, C, F and, if desired, D and/or E to be added straightaway to the prepolymer of component B in the vented extruder, and in this case the vented extruder usually has suitable mixing elements, such as kneading blocks. This may likewise be followed by discharge as an extrudate, cooling and pelletizing.

Component C

The novel molding compositions comprise from 0.1 to 60% by weight of reinforcing agents or fillers. They preferably comprise from 0.1 to 50% by weight, in particular from 1 to 40% by weight, of fibrous or particulate fillers or reinforcing materials, or mixtures of these. Each of the amounts given is based on the total weight of components A to F.

Preferred fibrous fillers or fibrous reinforcing materials are carbon fibers, potassium titanate whiskers, aramid fibers and particularly preferably glass fibers. If glass fibers are used they may have been provided with a size, preferably a polyurethane size, and with a coupling agent, to improve compatibility with the matrix material. The carbon fibers and glass fibers used generally have a diameter of from 6 to 20 µm.

The glass fibers may be incorporated either as short glass fibers or else as continuous-filament strands (rovings). The average length of the glass fibers in the finished injection molding is preferably from 0.08 to 0.5 mm.

Carbon fibers or glass fibers may also be used as wovens, mats or glass silk rovings.

Suitable particulate fillers are amorphous silica, carbonates, such as magnesium carbonate or chalk, powdered quartz, mica, a very wide variety of silicates, such as clays, muscovite, biotite, suzoite, tin maletite, talc, chlorite, phlogophite, feldspar, calcium silicates, such as wollastonite, or aluminum silicates, such as kaolin, particularly calcined kaolin.

In a particularly preferred embodiment use is made of particulate fillers in which at least 95% by weight, preferably at least 98% by weight, of the particles have a diameter (maximum dimension) determined on the finished product of less than 45 µm, preferably less than 40 µm, and of which the aspect ratio, determined on the finished product, is from 1 to 25, preferably from 2 to 20.

The particle diameters here may, for example, be determined by taking electron micrographs of thin sections of the polymer mixture and using at least 25, preferably at least 50, filler particles for the evaluation. The particle diameters may also be determined by sedimentation analysis as in Transactions of ASAE, page 491 (1983). The proportion by weight of fillers of size below 40 µm may also be measured by screen analysis. The aspect ratio is the ratio of particle diameter to thickness (largest to smallest dimension).

Particularly preferred particulate fillers are talc, kaolin, such as calcined kaolin, and wollastonite and mixtures of two or all of these fillers. Among these, particular preference is given to talc with a proportion of at least 95% by weight of particles of diameter less than 40 µm and with an aspect ratio of from 1.5 to 25, determined in each case on the finished product. Kaolin preferably has a proportion of at least 95% by weight of particles of diameter less than 20 µm and an aspect ratio of from 1.2 to 20, determined in each case on the finished product.

Component D

The novel molding compositions may, if desired, comprise impact-modifying rubbers D. The proportion of these is from 0 to 40% by weight, in particular from 0 to 25% by weight, particularly preferably from 0 to 20% by weight, based on the total weight of A to F.

Component D may also be a mixture of two or more different impact-modifying rubbers.

For the purposes of the present invention, rubbers are generally crosslinkable polymers which have elastomeric properties at room temperature.

Preferred rubbers which increase the toughness of molding compositions usually have two significant features: they comprise an elastomeric fraction which has a glass transition temperature below −10° C., preferably below −30° C., and they contain at least one functional group which can interact with the polyamide B or polyarylene sulfone A. Examples of suitable functional groups are carboxylic acid, carboxylic anhydride, carboxylic ester, carboxamide, carboximide, amino, hydroxyl, epoxy, urethane and oxazoline groups.

Preferred functionalized rubbers D include functionalized polyolefin rubbers built up from the following components:

$d_1$) from 40 to 99% by weight of at least one α-olefin having from 2 to 8 carbon atoms;

$d_2$) from 0 to 50% by weight of a diene;

$d_3$) from 0 to 45% by weight of a $C_1$–$C_{12}$-alkyl ester of acrylic or methacrylic acid, or mixtures of esters of this type;

$d_4$) from 0 to 40% by weight of an ethylenically unsaturated $C_2$–$C_{20}$ mono- or dicarboxylic acid or of a functional derivative of an acid of this type;

$d_5$) from 1 to 40% by weight of a monomer containing epoxy groups; and $d_6$) from 0 to 5% by weight of other monomers capable of free-radical polymerization.

Examples of suitable α-olefins $d_1$ are ethylene, propylene, 1-butylene, 1-pentylene, 1-hexylene, 1-heptylene, 1-octylene, 2-methylpropylene, 3-methyl-1-butylene and 3-ethyl-1-butylene. Ethylene and propylene are preferred.

Examples of suitable diene monomers $d_2$ are conjugated dienes having from 4 to 8 carbon atoms, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene, 5-ethylidenenorbornene and dicyclopentadiene. The diene content is generally from 0 to 50% by weight, preferably from 0.5 to 50% by weight, in particular from 2 to 20% by weight and particularly preferably from 3 to 15% by weight, based on the total weight of the olefin polymer.

Examples of suitable esters $d_3$ are methyl, ethyl, propyl, n-butyl, isobutyl, 2-ethylhexyl, octyl and decyl acrylates and the corresponding methacrylates. Among these particular preference is given to methyl, ethyl, propyl, n-butyl and 2-ethylhexyl acrylate and methacrylate.

Instead of the esters $d_3$, or in addition to these, the olefin polymers may also comprise acid-functional and/or latently acid-functional monomers in the form of ethylenically unsaturated mono- or dicarboxylic acids $d_4$.

Examples of monomers $d_4$ are acrylic acid, methacrylic acid, tertiary alkyl esters of these acids, in particular tert-butyl acrylate, and dicarboxylic acids, such as maleic acid and fumaric acid, and derivatives of these acids, and also their half-esters.

For the purposes of the invention, latently acid-functional monomers are those compounds which under the conditions of the polymerization or during incorporation of the olefin polymers into the molding compositions form free acid groups. Examples of these are anhydrides of dicarboxylic acids having from 2 to 20 carbon atoms, in particular maleic anhydride, and tertiary $C_1$–$C_{12}$-alkyl esters of the above-mentioned acids, in particular tert-butyl acrylate and tert-butyl methacrylate. Ethylenically unsaturated dicarboxylic acids and anhydrides $d_4$ have the following formulae IV and V:

$$R^5(COOR^6)C=C(COOR^7)R^8 \quad (IV)$$

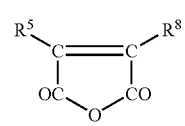

(V)

where $R^5$, $R^6$, $R^7$ and $R^8$, independently of one another, are H or $C_1$–$C_6$-alkyl.

Monomers $d_5$ containing epoxy groups have the following formulae VI and VII

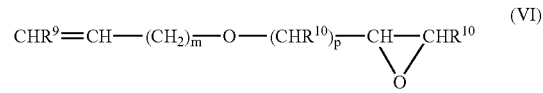

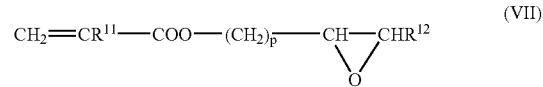

where $R^9$, $R^{10}$, $R^{11}$ and $R^{12}$, independently of one another, are H or $C_1$–$C_6$-alkyl, m is an integer from 0 to 20, and p is an integer from 0 to 10.

$R^5$ to $R^{12}$ are preferably hydrogen, m is preferably 0 or 1 and p is preferably 1.

Preferred compounds $d_4$ and, respectively, $d_5$ are maleic acid, fumaric acid and maleic anhydride and, respectively, alkenyl glycidyl ethers and vinyl glycidyl ether.

Particularly preferred compounds of the formulae IV and V and, respectively, VI and VII are maleic acid and maleic anhydride and, respectively, acrylates and/or methacrylates both of which contain epoxy groups, in particular glycidyl acrylate and glycidyl methacrylate.

Particularly preferred olefin polymers are those made from from 49.9 to 98.9% by weight, in particular from 59.85 to 94.85% by weight, of ethylene, and from 1 to 50% by weight, in particular from 5 to 40% by weight, of an ester of acrylic or methacrylic acid, and from 0.1 to 20.0% by weight, in particular from 0.15 to 15% by weight, of glycidyl acrylate and/or glycidyl methacrylate, acrylic acid and/or maleic anhydride.

Particularly suitable functionalized rubbers D are ethylene-methyl methacrylate-glycidyl methacrylate polymers, ethylene-methyl acrylate-glycidyl methacrylate polymers, ethylene-methyl acrylate-glycidyl acrylate polymers and ethylene-methyl methacrylate-glycidyl acrylate polymers.

Examples of other monomers $d_6$ are vinyl esters and vinyl ethers and mixtures of these.

The polymers described above may be prepared by processes known per se, preferably by random copolymerization at high pressure and elevated temperature.

The melt index of the copolymers is generally from 1 to 80 g/min 10 min (measured at 190° C. and 2.16 kg load).

Core-shell graft rubbers are another group of suitable rubbers. These are graft rubbers prepared in emulsion and composed of at least one hard and one soft constituent. Usually, a hard constituent is a polymer with a glass transition temperature of at least 25° C., and a soft constituent is a polymer with a glass transition temperature of not more than 0° C. These products have a structure made from a core (graft base) and from at least one shell (graft), and the structure is a result of the sequence of addition of the monomers. The soft constituents generally derive from butadiene, isoprene, alkyl acrylates, alkyl methacrylates or siloxanes and, if desired, other comonomers. Suitable siloxane cores may be prepared, for example, starting from cyclic oligomeric octamethyltetrasiloxane or from tetravinyltetramethyltetrasiloxane. These may, for example, be reacted with γ-mercaptopropylmethyldimethoxysilane in a ring-opening cationic polymerization, preferably in the presence of sulfonic acids, to give the soft siloxane cores. The siloxanes may also be crosslinked by, for example, carrying out the polymerization in the presence of silanes having hydrolyzable groups, such as halo or alkoxy, for example tetraethoxysilane, methyltrimethoxysilane or phenyltrimethoxysilane. Examples of suitable comonomers for this are styrene, acrylonitrile and crosslinking or grafting monomers having more than one polymerizable double bond, for example diallyl phthalate, divinylbenzene, butanediol diacrylate or triallyl (iso)cyanurate. The hard constituents generally derive from styrene, α-methylstyrene or from copolymers of these, and preferred comonomers here are acrylonitrile, methacrylonitrile and methyl methacrylate.

Preferred core-shell graft rubbers comprise a soft core and a hard shell or a hard core, a first soft shell and at least one further hard shell. The incorporation of functional groups here, such as carbonyl, carboxylic acid, anhydride, amide, imide, carboxylic ester, amino, hydroxyl, epoxy, oxazoline, urethane, urea, lactam or halobenzyl groups, preferably takes place by adding suitably functionalized monomers during the polymerization of the final shell. Examples of suitable functionalized monomers are maleic acid, maleic anhydride, half-esters or diesters, or maleic acid, tert-butyl (meth)acrylate, acrylic acid, glycidyl (meth)acrylate and vinyloxazoline. The proportion of monomers with functional groups is generally from 0.1 to 25% by weight, preferably from 0.25 to 15% by weight, based on the total weight of the core-shell graft rubber. The weight ratio of soft to hard constituents is generally from 1:9 to 9:1, preferably from 3:7 to 8:2.

Rubbers of this type are known per se and are described, for example, in EP-A 208 187.

Thermoplastic polyester elastomers are another group of suitable impact modifiers. For the purposes of the invention, polyester elastomers are segmented copolyetheresters which comprise long-chain segments generally deriving from poly(alkylene) ether glycols and short-chain segments deriving from low-molecular-weight diols and dicarboxylic acids. Products of this type are known per se and are described in the literature, for example in U.S. Pat. No. 3,651,014. Corresponding products are also available commercially as Hytrel® (Du Pont), Arnitel® (Akzo) and Pelprene® (Toyobo Co. Ltd.).

It is also, of course, possible to use mixtures of various rubbers.

Component E

The novel molding compositions may comprise, as component E, additives, such as processing aids, pigments, stabilizers, flame retardants, or mixtures of various additives. Other examples of customary additives are oxidation retarders, agents to inhibit decomposition caused by heat or by ultraviolet light, lucricants, mold-release agents, dyes and plasticizers.

Their proportion, based on the total weight of components A to F, is according to the invention from 0 to 40% by weight, preferably from 0.01 to 20% by weight, in particular from 0.01 to 15% by weight. (Trans 22/30–34)

Pigments and dyes are generally present in amounts of up to 6% by weight, preferably from 0.5 to 5% by weight and in particular from 0.5 to 3% by weight where component E comprises stabilizers, the proportion thereof is usually up to 2% by weight, preferably from 0.01 to 1% by weight, in particular from 0.01 to 0.5% by weight, based on the total weight of A to F.

The pigments for coloration of thermoplastics are well known: see for example R. Gächter and H. Müller, Taschenbuch der Kunststoffadditive, Carl Hanser Verlag, 1983, pp. 494–510. A first preferred group of pigments is that of white pigments, such as zinc oxide, zinc sulfide, white lead (2 $PbCO_3 \cdot Pb(OH)_2$), lithopones, antimony white and titanium dioxide. Of the two most common crystal forms of titanium dioxide (rutile and anatase) it is the rutile form in particular which is used for white coloration of the novel molding compositions.

Black pigments which may be used according to the invention are iron oxide black ($Fe_3O_4$), spinel black ($Cu(Cr, Fe)_2O_4$), manganese black (a mixture of manganese dioxide, silica and iron oxide), cobalt black and antimony black, and particularly preferably carbon black, usually used in the form of furnace black or gas black (see in this connection G. Benzing, Pigmente für Anstrichmittel, Expert-Verlag (1988), pp. 78ff.).

Inorganic color pigments, such as chromium oxide green, or organic color pigments, such as azo pigments and phthalocyanines, may, of course, be used according to the invention to achieve particular shades of color. Pigments of this type are widely available commercially.

Examples of oxidation inhibitors and heat stabilizers which according to the invention may be added to the thermoplastic compositions are halides of metals of Group I of the Periodic Table, e.g. those of sodium, of potassium or of lithium for example chlorides, bromides or iodides. It is also possible to use zinc fluoride and zinc chloride. Other compounds which may be used are sterically hindered phenols, hydroquinones, substituted representatives of this class, secondary aromatic amines, if desired combined with phosphorus-containing acids and/or salts of these, and mixtures of these compounds, preferably in concentrations of up to 1% by weight, based on the weight of the mixture A to F.

A particularly preferred component E added to the novel molding compositions is copper(I) chloride, copper(I) bromide or copper(I) iodide or a mixture of these. Copper(I) iodide is preferably used. The amount used here is generally from 0.01 to 1.0% by weight, preferably from 0.01 to 0.5% by weight, based on the total weight of A to F.

Examples of UV stabilizers are various substituted resorcinols, salicylates, benzotriazoles and benzophenones, and the amounts of these used are usually up to 2% by weight.

Lubricants and mold-release agents, generally added in amounts of up to 1% by weight to the thermoplastic composition, are stearic acid, stearyl alcohol, alkyl stearates and stearamides, and also esters of pentaerythritol with long-chain fatty acids. It is also possible to use stearates of calcium, of zinc or of aluminum, and also dialkyl ketones, e.g. distearyl ketone.

Other possible additives are nucleating agents, such as talc.

Component F

The proportion of component F in the novel molding compositions is from 0.1 to 30% by weight, based on the total weight of components A to F. The amount of component F in the novel molding compositions, based in each case on the total weight of components A to F, is preferably from 0.2 to 20% by weight, in particular from 0.5 to 10% by weight.

The materials of component F are thermotropic polymers. For the purposes of the present invention, thermotropic polymers are polymers which have liquid-crystalline properties over a particular temperature range. Particularly suitable components F comprise thermotropic polymers which are liquid-crystalline over a temperature range within which the novel molding compositions are processed. The temperature $T_k$ of the transition of the liquid-crystalline phase into the melt for the polymers suitable as component F is generally 350° C. or below. The temperature $T_k$ of the transition is 300° C. or below for preferred liquid-crystalline polymers F. The temperature $T_k$ of the transition is in particular from 200 to 350° C.

Possible components F are generally thermotropic polyesters, thermotropic polyesteramides or thermotropic polyamides.

It is preferable for entirely aromatic polyesters or copolyesters to be used as component F. By way of example, suitable liquid-crystalline polymers have the repeat structural units

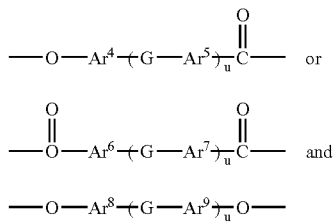

or (VIII and IX) or (VIII and X) or (VIII and IX and X), where each of $Ar^4$ to $Ar^9$, independently of the others, is arylene which may have from 6 to 18 carbon atoms, for example phenylene, naphthylene or biphenylene. The arylene groups may be unsubstituted or have substituents. These substituents include $C_1$–$C_{10}$-alkyl, such as methyl, n-propyl, n-butyl or tert-butyl, and also $C_1$–$C_4$-alkoxy, such as methoxy, ethoxy or butoxy. The substituents may also be phenyl or halogen, in particular chlorine.

u may be 0 or 1, and

G is $SO_2$ or a 1,4-benzoquinone radical.

Examples of polyesters of this type are those which derive from one or more of the following monomeric units: p-hydroxybenzoic acid, m-hydroxybenzoic acid, terephthalic acid, isophthalic acid, hydroquinone, phenylhydroquinone, alkyl-substituted hydroquinones, in particular 2-methylhydroquinone, 2-ethylhydroquinone, 2-n-propylhydroquinone, 2-isopropylhydroquinone or 2-tert-butylhydroquinone, and halo-substituted hydroquinones, in particular 2-chlorohydroquinone.

Other examples of suitable monomers are 4,4'-dihydroxydiphenyl ether, 1,3-dihydroxybenzene, 4,4'-biphenol, 2,6,2',6'-tetramethylbiphenol, 2,6-dihydroxynaphthalene, 2,7-dihydroxynaphthalene, 2,6-naphthalenedicarboxylic acid, 6-hydroxy-2-naphthalenecarboxylic acid, 4,4'-bis(p-hydroxyphenoxy)diphenyl sulfone, 2,6-dihydroxyanthraquinone, 4,4'-diphenyl ether dicarboxylic acid and 4,4'-dihydroxybenzophenone.

Other suitable polyesters derive from the abovementioned dicarboxylic acids and from aliphatic or cycloaliphatic polyols, preferably from diols. Possible diols are compounds of formula (XI)

 (XI)

where $R^{13}$ is $C_2$–$C_{18}$-alkylene, preferably $C_2$–$C_{10}$-alkylene, in substituted or unsubstituted form, e.g. ethylene, propylene, butylene, pentylene, or hexylene. It is particularly preferable for there to be a bond between one of the two hydroxyl groups and the first and, respectively, the last carbon atom in the longest carbon chain. $R^{13}$ may also be a cycloaliphatic, unsubstituted or substituted, radical having from 3 to 12 carbon atoms, preferably from 5 to 8 carbon atoms, for example cyclopropylene, cyclopentylene or cyclohexylene. Preferred diols are ethylene glycol, 1,4-butanediol, 2,2-dimethyl-1,3-propanediol, 1,6-hexanediol, 1,10-decanediol and 1,4-cyclohexanedimethanol.

Particularly preferred novel molding compositions comprise, as component F, liquid-crystalline copolyesters with repeat units of the structure

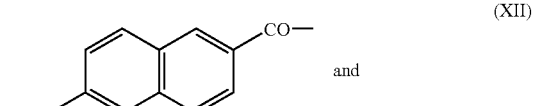

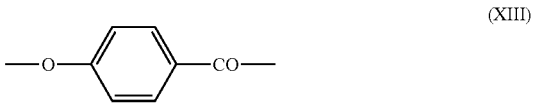

These copolyesters generally contain from 10 to 90 mol % of the units (XII) and from 10 to 90 mol % of the units (XIII).

Other possible liquid-crystalline polymers F are polyesteramides which have repeat units of the structure

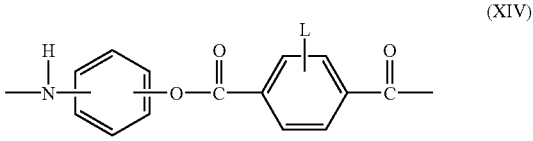

either by themselves or combined with other units, such as IX, X or XI. The radical L may be hydrogen, $C_1$–$C_{10}$-alkyl, e.g. methyl, ethyl, n-propyl, isopropyl or n-butyl, preferably methyl, $C_1$–$C_{10}$-alkoxy, such as methoxy, ethoxy, n-propoxy, isopropoxy or n-butoxy, preferably methoxy, or halogen, preferably chlorine.

The molar masses $M_w$ (weight-average) of the liquid-crystalline polymers used according to the invention as component F are generally from 1500 to 150,000 g/mol, preferably from 2500 to 50,000 g/mol.

Liquid-crystalline polymers of this type are known per se or may be prepared by known methods.

Suitable preparation methods are mentioned in U.S. Pat. No. 4,161,470, for example. Other preparation methods may be found in EP-A 139 303, 226 839, 226 978, 225 539, 226 847 and 257 558, for example, and reference may be made to these at this point for further details.

The novel molding compositions may be prepared by known processes, for example by extrusion.

The molding compositions may be prepared, for example, by mixing the starting components in customary mixing equipment, such as screw extruders, preferably twin-screw extruders, Brabender mixers or Banbury mixers, or else in kneaders, followed by extrusion. After extrusion the extrudate is usually cooled and comminuted.

The sequence of mixing the components may be varied, and two or, if desired, three components may therefore be premixed, or else all of the components may be mixed together.

To obtain a very homogeneous molding composition, intensive and thorough mixing is advantageous. The average mixing times required for this are generally from 0.2 to 30 minutes at from 280 to 370° C., preferably from 290 to 360° C.

Together with good mechanical properties, such as high heat resistance, notched impact strength or stiffness, the novel molding compositions particularly feature improved stability during processing, in particular melt stability, and improved flow properties.

The novel molding compositions are suitable for producing moldings, films or fibers. Examples of application for these are household items, electrical or electronic components and devices in medical technology. They are particularly suitable for producing moldings for the motor vehicle sector, in particular in the automotive sector. Examples of these are inlet manifolds, water tanks, housings, ventilation pipes, fastening components, sleeves and cooling fan wheels.

EXAMPLES

Test Methods:

The viscosity number (VN [ml/g]) of the polyarylene ether sulfones was determined in a 1% strength by weight solution using N-methylpyrrolidone at 25° C.

The viscosity number (VN [ml/g]) of the polyamides was determined to DIN 53 727 on a 0.5% strength by weight solution in 96% strength by weight sulfuric acid at 25° C.

The proportion of acid groups in the polyarylene ether sulfones a2 was determined by $^1$H-NMR spectroscopy, as described by I. W. Parsons et. al., Polymer 34, 2836 (1993).

The glass transition temperature $T_g$ and the melting peak were determined using DSC measurements on specimens in the second heating cycle with a heating rate of 20 K/min.

The heat resistance of the specimens was determined by using the Vicat softening point (Vicat B [° C.]). This was determined on standard small specimens to DIN 53 460 with a force of 49.05 N and a temperature rise of 50 K/h.

Notched impact strength ($a_k$ [kJ/m$^2$]) was determined on ISO specimens to ISO 179 1eA.

Stiffness (modulus of elasticity) was determined to DIN 53 457.

Flowability (MVR [ml/10']) was determined to DIN 53 735 at 300° C. with a load of 10 kg.

As a measure of melt stability, the change in the viscosity was followed over a period of 30 minutes in a capillary rheometer at 350° C. The percentage fall in the viscosity after 30 minutes is given, based on the starting level ($\Delta\eta$ [%]).

Preparation of the Molding Compositions

Component A a1) Polyarylene Ether Sulfone Inert to Polyamides

A polyarylene ether sulfone having repeat units of the formula I$_1$, Ultrason® E 2010, a commercially available product from BASF AG, was used as A1. A characteristic feature of this product is a viscosity number of 54 ml/g, measured on a 1% strength NMP solution at 25° C.

a2) Functionalized Polyarylene Ether Sulfone Capable of Reacting with Polyamides Component A2 Was Prepared as Follows:

5.742 kg of dichlorodiphenyl sulfone, 5.076 kg of dihydroxydiphenyl sulfone and 305.8 g of 4,4'-dihydroxyvaleric acid were dissolved in 29 kg of N-methylpyrrolidone under nitrogen and mixed with 2.820 kg of anhydrous potassium carbonate. The reaction mixture was first heated for 1 h to 180° C. at a pressure of 300 mbar while the water of reaction and N-methylpyrrolidone were continuously removed by distillation, and was then further reacted for 6 h at 190° C.

After addition of 40 kg of N-methylpyrrolidone, the inorganic constituents were filtered off. Basic groups were neutralized by adding 300 ml of glacial acetic acid, and the polymer was then isolated by precipitation in water. After 3 extractions with water the product was dried at 140° C. in vacuo, giving a white powder.

The proportion of units with acid groups was determined by $^1$H-NMR at 3.0 mol %, and the viscosity number of the product was 40.2 ml/g.

Component A3 Was Prepared as Follows:

4.593 kg of dichlorodiphenyl sulfone and 4.002 kg of dihydroxydiphenyl sulfone were dissolved in 29 kg of N-methylpyrrolidone under nitrogen and mixed with 2.923 kg of anhydrous potassium carbonate.

The reaction mixture was first heated for 1 h to 180° C. at a pressure of 300 mbar while the water of reaction and N-methylpyrrolidone were continuously removed by distillation, and then further reacted for 6 h at 190° C.

After this time, 235 g of 4-fluorophthalic anhydride were added to the mixture, and the reaction was continued for 0.2 h at 190° C.

After adding 40 kg of N-methylpyrrolidone, the inorganic constituents were filtered off, and the polymer was then isolated by precipitation in water. After 3 extractions with water, the product was dried at 160° C. in vacuo, giving a white material.

The content of phthalic anhydride end groups was 0.83% by weight, and the viscosity number of the polyarylene ether was 49.7 ml/g.

Component B

A partly aromatic copolyamide, condensed from 55 parts by weight of terephthalic acid, 35 parts by weight of ε-caprolactam and 38.5 parts of hexamethylenediamine, was used as polyamide B1. Characterizing features of this material are a viscosity number of 210 ml/g, a glass transition temperature of 110° C. and a melting point of 289° C.

A nylon-6 obtained from ε-caprolactam and having a viscosity number of 250 ml/g (Ultramid®B4, commercially available product from BASF AG) was used as polyamide B2.

A nylon-6 obtained from ε-caprolactam and having a viscosity number of 140 ml/g was used as polyamide B3.

Component C

Chopped glass fibers with polyurethane size, fiber diameter 10 μm, were used as filler C1.

Component E:

Copper iodide, CuI, was used as stabilizer E1.

Component F:

A liquid-crystalline copolyester with repeat units of formulae XII und XIII was used as thermotropic polymer F1. Characterizing features of this polymer are a modulus of elasticity of 10.4 kN/mm$^2$ and a temperature $T_k$ of about 280° C. for the transition determined by DSC. An example of a polymer of this type is the commercially available product Vectra® A 950 from Ticona.

The components were mixed in a twin-screw extruder at a melt temperature of from 300 to 350° C. The melt was passed through a water bath and pelletized.

The molding compositions were processed at 340° C. In each case the mold temperature was 100° C.

Table 1 lists the makeups of the molding compositions and the results of the tests.

TABLE 1

| Molding composition | 1c | 1 | 2 | 3 | 2c | 4 | 5 | 6 | 3c | 4c |
|---|---|---|---|---|---|---|---|---|---|---|
| Make up: | | | | | | | | | | |
| A1 | 49 | 48 | 47 | 41 | 49 | 48 | 47 | 41 | 49 | 48 |
| A2 | — | — | — | 7 | — | — | — | — | — | — |
| A3 | — | — | — | — | — | — | — | 7 | — | — |
| B1 | 20.99 | 20.99 | 20.99 | 20.99 | — | — | — | — | — | — |
| B2 | — | — | — | — | 20.99 | 20.99 | 20.99 | 20.99 | — | — |
| B3 | — | — | — | — | — | — | — | — | 20.99 | 20.99 |
| C1 | 30 | 30 | 30 | 30 | 30 | 30 | 30 | 30 | 30 | 30 |
| E1 | 0.01 | 0.01 | 0.01 | 0.01 | 0.01 | 0.01 | 0.01 | 0.01 | 0.01 | 0.01 |
| F1 | — | 1 | 2 | 1 | — | 1 | 2 | 1 | — | 1 |
| Properties: | | | | | | | | | | |
| Vicat B [°C.] | 206 | 206 | 207 | 206 | 204 | 203 | 203 | 203 | 204 | 204 |
| $a_k$ [kJ/m$^2$] | 7.7 | 8.3 | 8.7 | 9.1 | 8.9 | 9.4 | 9.9 | 10.5 | 7.6 | 7.9 |
| Modulus of elasticity [kN/mm$^2$] | 11.7 | 11.7 | 11.8 | 11.8 | 12.1 | 12.1 | 12.2 | 12.1 | 11.4 | 11.5 |
| MVR [ml/10'] | 21 | 54 | 90 | 55 | 26 | 64 | 100 | 57 | 76 | 93 |
| Δη [%] | 76 | 61 | 45 | 57 | 80 | 65 | 50 | 60 | 84 | 86 |

The novel thermoplastic molding compositions have markedly improved flow properties and melt stability together with very good mechanical properties.

We claim:

1. A molding composition comprising

A) from 1 to 98.8% by weight of at least one polyarylene ether sulfone,

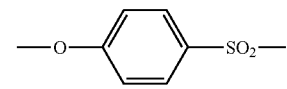

(I1)

and from 0 to 100 mol % of repeat units

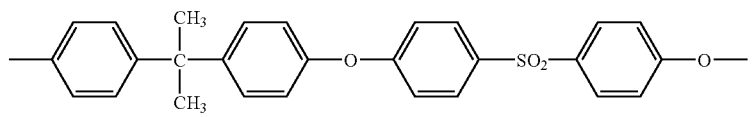

(I2)

B) from 1 to 98.8% by weight of at least one thermoplastic polyamide,

C) from 0.1 to 60% by weight of at least one filler,

D) from 0 to 40% by weight of at least one impact-modifying rubber,

E) from 0 to 40% by weight of one or more different additives, and

F) from 0.1 to 30% by weight of at least one thermotropic polymer, where the total of the percentages by weight of components A to F is 100%, wherein component B has a viscosity number of from 180 to 350 ml/g (measured in 0.5% strength by weight solution in 96% strength by weight sulfuric acid to DIN 53 727).

2. A molding composition as claimed in claim 1, in which the polyarylene ether sulfone A contains from 0 to 100 mol % of repeat units 3. A molding composition as claimed in claim 1, where A is a mixture made from at least one polyarylene ether sulfone a1 having groups which are inert to the polyamides B and from at least one polyarylene ether sulfone a2 which contains groups which can react with the polyamides B.

4. A molding composition as claimed in claim 3, in the polyarylene ether sulfones a2, the groups which can react with the groups in the polyamides B are anhydride, carboxyl, epoxy or amino groups or a mixture of these.

5. A molding composition as claimed in claim 1, where component B is a partly aromatic polyamide.

6. A molding composition as claimed in claim 1, where component B is an aliphatic polyamide.

7. A molding composition as claimed in claim 1, which comprises from 0.01 to 0.5% by weight, based on the total weight of A to F, of at least one component E which is composed of copper(I) chloride, copper(I) bromide, copper(I) iodide or a mixture of these compounds.

8. A molding composition as claimed in claim 1, in which component F is a thermotropic polyester, a thermotropic polyesteramide or a thermotropic polyamide.

9. A molding composition as claimed in claim 1, in which component F is a thermotropic copolyester containing repeat units of the structures
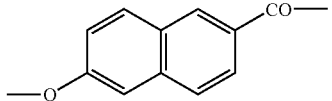
(XII)
and
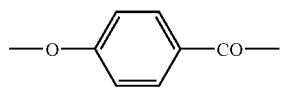
(XIII)
10. A molding, a film or a fiber obtainable from the molding compositions as claimed in claim 1.
* * * * *